Dec. 24, 1940.  H. GARDNER ET AL  2,226,166
OSCILLATING MOTOR FOR SIGNALING DEVICES
Filed Nov. 30, 1936
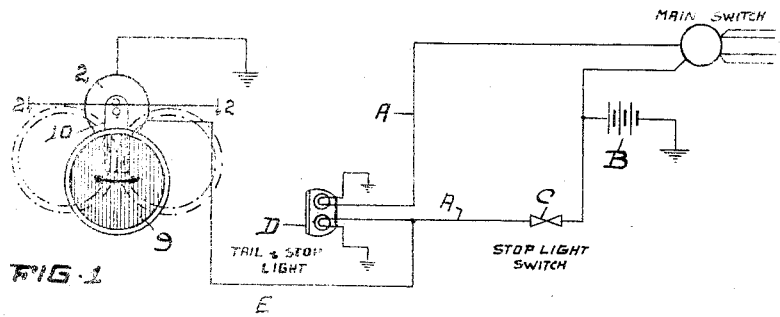
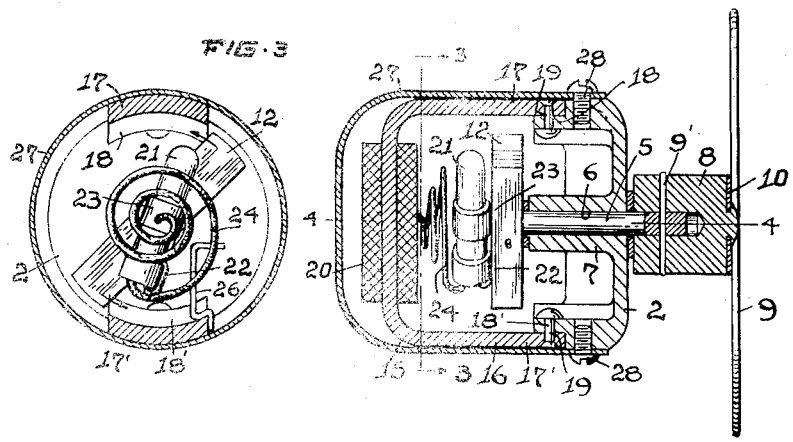
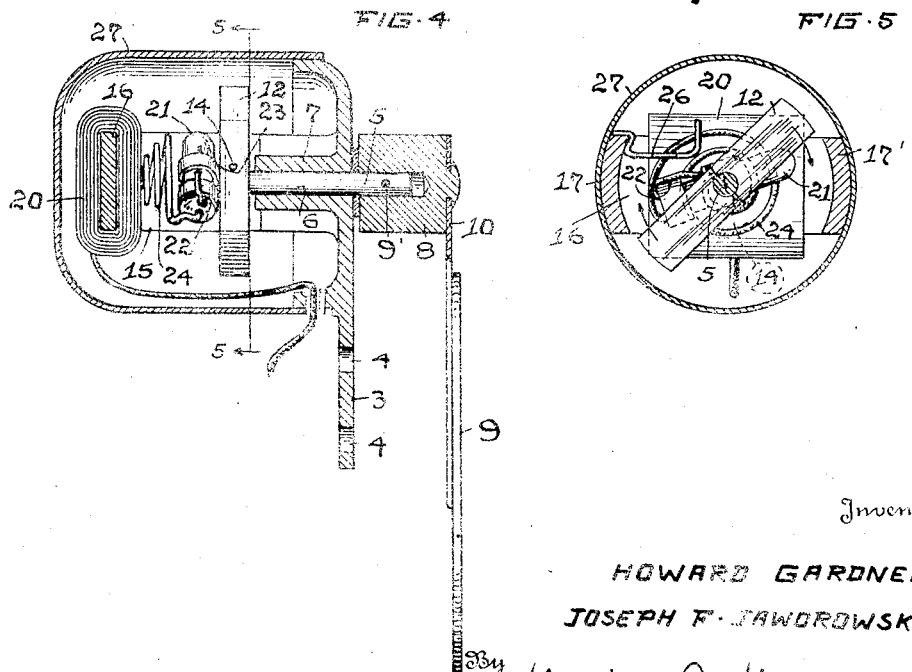
Inventors
HOWARD GARDNER
JOSEPH F. JAWOROWSKI
By Gustav A. Wolff
Attorney Patented Dec. 24, 1940

2,226,166

UNITED STATES PATENT OFFICE 2,226,166

OSCILLATING MOTOR FOR SIGNALING DEVICES

Howard Gardner and Joseph F. Jaworowski, Cleveland, Ohio; said Jaworowski assignor to said Gardner Application November 30, 1936, Serial No. 113,375

1 Claim. (Cl. 172—126)

This application relates in general to signaling devices and more particularly to a signaling device for an automobile adapted to visibly indicate the operation of the braking mechanism of the automobile. Presently used devices for this purpose, so-called stop signal lights, are clearly visible only on dark days and in the dark, and the signals of these devices are entirely lost, when artificial light and sunlight shines on and is reflected from these devices.

It is the primary object of this invention to provide a signaling device for automobiles, which device will more clearly indicate signals by means of a light reflecting, oscillatory signal member, controlled by the braking mechanism of an automobile so that oscillations of the signal member indicate the operation of the braking mechanism of the automobile.

Another object of the invention is the provision of a signaling device for automobiles embodying a light reflecting signal disc, mounted to swing in a pendulum-like manner, and electrically actuated operating means for effecting oscillatory movements of said disc.

A further object of the invention is the provision of a signaling device for automobiles embodying an oscillatory, light reflecting disc, electromagnetically operated means for oscillating said disc, and electric means controlled by the braking mechanism of the automobile for effecting oscillations of the oscillatory disc simultaneously with the operation of the braking mechanism.

Still another object of the invention is the provision of a new and improved signaling device of the type referred to of simple and sturdy design, compact and light in weight, the parts of which can readily and easily be assembled.

With these and incidental objects in view, the invention consists in certain novel features of construction and combination of parts, the essential elements of which are set forth in the appended claim; and a preferred form of embodiment of the invention is hereinafter shown with reference to the drawing forming part of the specification.

In the drawing:

Fig. 1 is a diagrammatic view of the signaling circuit of an automobile, which circuit includes a signaling device according to the invention.

Fig. 2 is a horizontal sectional view through the signaling device shown in Fig. 1, the section being taken on line 2—2 of Fig. 1.

Fig. 3 is a cross sectional view on line 3—3 of Fig. 2.

Fig. 4 is a transversal sectional view through the signaling device according to the invention, the section being taken on line 4—4 of Fig. 2; and Fig. 5 is a cross sectional view on line 5—5 of Fig. 4.

Referring now more particularly to the drawing, illustrating a practical embodiment of the invention, reference numeral 2 represents a circular, flanged base member, preferably made of diamagnetic material such as brass, which base member embodies a downwardly extending bracket arm 3, provided with holes 4 for attaching the base member 2 to the rear end of an automobile. The base member 2 pivotally supports a shaft 5, extended through a central bore 6 in said member and through a central hub-like extension 7 in said member, which shaft, at its exposed front end, carries a sleeve 8, pinned to the shaft by means of a pin 9'. Sleeve 8 has suspended therefrom a circular, light reflecting, red disc 9, which disc has its bracket arm 10 secured to said sleeve. The rear end of the shaft 5 supports a cross bar 12, secured to said shaft by means of a pin 14, and this cross bar forms the rotatable armature of an electromagnet 15, the paramagnetic body of which consists of a yoke 16, having its opposite ends 17, 17' supported by and rigidly attached to oppositely arranged supporting arms 18, 18', which arms extend integrally from base member 2, rivets 19 being used to secure the ends 17, 17' to the arms 18, 18', respectively. The central portion of the yoke 16 supports a coil 20, wound around said portion and effecting magnetization of the electromagnet 15, when current is sent through said coil. To that effect the coil 20 is electrically connected to an automobile stop light circuit A, parallel to the stop signal light D thereof, which circuit includes a battery B and a controlling switch C, mechanically coupled with and operated by the brake pedal of an automobile (not shown). The arrangement described permits of simultaneous, individual operation of the signal stop light and of the signaling device according to the invention.

A switch 21, preferably though not necessarily a quicksilver switch, secured to and movable with the armature 12 of the electromagnet 15 effects oscillations of the signaling disc 9 by opening and or closing the circuit branch E with the signaling device. Thus, when the switch 21 is closed and the switch C of the circuit A is closed by operating the brake pedal, then the electromagnet 15 is energized and effects rotation of the armature 12 into alignment with the yoke 16. During this movement of the armature 12 switch 21 interrupts the current in the circuit branch E and then the weight of the signaling disc effects return of the armature 12 to its initial position, in which the switch 21 again closes the circuit branch E, so that the cycle may repeat itself.

The alternate opening and closing of the circuit branch E in the manner described effects oscillatory movements of the shaft 5 and the disc 9.

Preferably, as shown, circuit branch E is grounded through the base member 2 of the signaling device by connecting the wire 22 of the switch 21 to a metal clamp 23, attaching switch 21 to the armature 12. The wire 24 of the switch 21 is electrically connected to the coil 20, the connecting portion 24 being helically shaped to avoid excessive bending and breakage of said wire.

An angular, yielding stop member 26, secured to the yoke 16, prevents excessive movements of the armature and thus prohibits complete rotation of the armature and the signaling disc 9.

The entire mechanism is covered and protected by a cylindrical shell, 27, sleeved upon the base member 2 and rigidly attached thereto by means of screws 28.

Having thus described our invention, what we claim is:

An oscillating motor for signaling devices comprising a cup-shaped body member, an electro-magnet of U-shaped form directly secured with its arms to the circumferential wall of said body member opposite its open end, and in axial alignment therewith, a shaft freely rotatably extended through said body member and centrally thereof for axial alignment with said electro-magnet, lever means attached to the outer end of said shaft adapted to rotate same by gravity, armature means secured to the inner end of said shaft, said armature means cooperating with said electro-magnet being adapted to rotate said shaft by magnetic force, a single electric switch attached to said armature and actuated by its movements, and a source of electric energy electrically connected with said electro-magnet by said switch for controlling said source of electric energy by said switch.

HOWARD GARDNER.
JOSEPH F. JAWOROWSKI.